(12) United States Patent
Kabasawa

(10) Patent No.: US 7,152,234 B2
(45) Date of Patent: Dec. 19, 2006

(54) DISK DEVICE

(75) Inventor: Hidetoshi Kabasawa, Tokyo (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 10/402,913

(22) Filed: Mar. 28, 2003

(65) Prior Publication Data

US 2004/0027962 A1    Feb. 12, 2004

(30) Foreign Application Priority Data

Mar. 29, 2002   (JP) .............................. 2002-097056
Mar. 29, 2002   (JP) .............................. 2002-097122

(51) Int. Cl.
*G11B 17/22*   (2006.01)

(52) U.S. Cl. ..................................... 720/606

(58) Field of Classification Search ............... 369/75.1, 369/75.2
See application file for complete search history.

(56) References Cited

U.S. PATENT DOCUMENTS

| | | | | |
|---|---|---|---|---|
| 5,802,021  | A  * | 9/1998 | Mukaida .................. | 369/30.32 |
| 5,854,776  | A  * | 12/1998 | Sakiyama ................. | 369/30.78 |
| 6,614,748  | B1 * | 9/2003 | Shiomi et al. .............. | 720/697 |
| 2001/0021155 | A1* | 9/2001 | Saito ......................... | 369/75.1 |
| 2002/0018426 | A1* | 2/2002 | Minase ...................... | 369/75.2 |

FOREIGN PATENT DOCUMENTS

| | | |
|---|---|---|
| JP | 7287911 | 10/1995 |
| JP | 11-203801 | 7/1999 |

* cited by examiner

*Primary Examiner*—A. J. Heinz
*Assistant Examiner*—Mark Blouin
(74) *Attorney, Agent, or Firm*—Weingarten, Schurgin, Gagnebin & Lebovici LLP

(57) ABSTRACT

The object is to keep the system safety even if the disk tray of the disk device is drawn out from the PC main body and led to a structurally dangerous state, and to prevent the disk tray from wrong operation beforehand. In addition, in a recording and playback system for recording and reproducing information on a recording medium such as optical disk, the guide shaft is biased by a bias means that can strongly apply power which doesn't degenerate, in order to improve the mounting stability, and in addition, to prevent the structural thickness of the entire unit from growing. A disk device composed to execute a load/unload a recording medium by making a disk tray advance and retreat in a chassis case, wherein a first detection switch 5 and a second detection switch 6 for detecting the load of the disk tray 1 are arranged in a way to be on different levels in respect to the operating direction thereof, or they are arranged on a wiring board packaged in the disk tray. Also, a recording and playback system, comprising a head unit composed to record and playback of an information by moving in parallel to the recording face of a recording medium; a guide shafts 10·13 for guiding the translation of the head unit; a bias means for applying bias force to the guide shaft all times; and a retaining means for adjusting the height position of the guide shaft by a drag balanced with the bias force of the bias means, wherein the bias means is composed by inserting a coil parts 22a·23a·24a of a helical torsion springs 22·23·24 into the guide shafts 10·13.

8 Claims, 11 Drawing Sheets

(A)

(B)

(C)

DISK DEVICE

BACKGROUND OF THE INVENTION

1. Field of the Invention

The present invention concerns a bias means of a guide shaft in order to guide the movement of a head unit mainly composed of an optical pick-up of a disk device that drives an optical disk (for instance, CD-R/RW, DVD-R/RW, etc.) as the recording medium for recording a great deal of information in various computer systems and so on, and a recording and playback system built in the computer or audio-visual equipment or diffused as a peripheral unit.

2. Detailed Description of the Prior Art

In general, the PC (hereinafter, it is called PC) cannot lack the disk device for recording/reproduction of information on an optical disk, and so builds it into the PC main body or connects it so called as an external device with the cable.

FIG. 4 shows the externals of a laptop PC with a built-in disk device, and in general, the Disk device D is built into a side of a main body P of the PC, the part of bezel 102 of a disk tray 101 pops out according to the instruction from the switch operation or the PC, and in addition the user of the PC draws out a disk tray 101 and usually loads the optical disk.

In such a disk device D, a turntable 103 fixed to a driving shaft of a spindle motor disposed right under is arranged at the center of the disk tray 101 as shown in FIG. 5, the turntable clamps a center hole of the optical disk so as to transmit the turning force. Moreover, a head unit 104 composed mainly of an optical pickup reciprocates radially in a slit 101a formed in the disk tray for recording and the reproduction information on the optical disk.

Moreover, the disk tray 101 composed like this is guided by a guide rail 105 and is contained in chassis case 106. The bezel 102 of the disk tray 101 usually inserts a tongue piece 102a thereof in the main body of the disk tray, fixes by fitting, and in addition screws if necessary.

Moreover, the recording and playback system, in which the optical disk (for instance, CD-R/RW, DVD-R/RW) that can record a great deal of information, is used as recording medium, is indispensable especially for the PC, and for audio-video equipment, the recording/reproduction of an information is performed using DVD as a recording medium, so the reliability and the durability is highly demanded for the recording and playback system.

FIG. 4 is the one to show the externals of a laptop PC, and a recording and playback system D is built in a side section of a main body P of the PC, to load and unload an optical disk with a disk tray. In general, the mechanism for loading and unloading the disk tray is omitted, because a laptop PC has to compose extremely flatly, and the disk tray loading is operated as the user pushes it by the finger tip.

The recording and playback system adopted for such a laptop PC is composed unitarily as shown in FIG. 6, and this also becomes an extremely flat form. In the same drawing, the symbol 101 is a disk tray, and this disk tray is guided to a guide rail 105 and contained in a chassis case 106.

A turntable 103 fixed to a driving shaft of a spindle motor disposed right under turntable 103 is arranged at the center of the disk tray 101, and a center hole of the optical disk is clamped with this turntable, and the turning force is transmitted. The symbol 104 is a head unit mainly composed of the optical pickup, it moves radially in a slit 101a formed in the disk tray, to record or reproduce information on the optical disk.

In general, the head unit 104 is fixed to a head base 104a, and head base 104a is slidably attached to a guide shaft, and the head base is composed to translate in a lead groove of a screw shaft, in order to enable a radial movement of the head unit in the disk tray 101.

The inclination of an optical axis of the optical pickup, inclination of the spindle motor and, especially, mounting displacement of the guide shaft make it difficult to determine accurately the relative inclination and distance between the optical pickup and the recording face of the optical disk, in case of such composition. The displacement may vary for each finished product, and the attempt to enable the correction of the displacement in the post-processing has been proposed (for instance, Japanese Patent Laid-Open No. 2000-203801).

As shown in FIG. 11, this consists in arranging a guide shaft 109 so as to be fitted by a seat of an adjusting screw 108 screwed in a chassis 112, and in interposing a helical compression spring 110 between this guide shaft and the chassis, for adjusting the height position of the guide shaft 109 biased upward by rotating the adjusting screw 108. Moreover, in FIG. 9, a leaf spring is interposed in place of the helical compression spring, for adjusting similarly the height position of the guide shaft 109 by rotating the adjusting screw 108.

Also, in the disk device composed as shown in FIG. 5, the chassis case 106 constituting the fixed part is attached to the PC main body, while the disk tray 101 constituting the moving part advances and retracts in this chassis case 106. Therefore, the opening of the chassis case 106 faces the sidewall of the PC main body, and a gap G is formed between an opening 106a of the chassis case 106 and a rear end 101a of the disk tray 101, as shown in FIG. 5.

The disk device in the form shown in FIG. 6 a detection switch 108 that detects the retraction momentarily at the time when the disk tray 101 is drawn out from the PC main body by unloading is set in the disk tray 101 as shown in FIG. 6 or is set in a wiring board 107 mounted on the disk tray 101 and the driving state of the disk tray 101 is recognized, or the power supply to a microcomputer of the wiring board mounted on the disk tray is intercepted based on the signal from this detection switch 108, and the system safety of the device has been improved.

However, if the disk tray is drawn out completely as shown in FIG. 5 when the optical disk is set on the disk tray and loaded, the gap G is created as mentioned above. In such a state, the device is susceptible to damage and risks system safety.

That is, for instance, a foreign body such as a piece of paper, etc. might enter the gap G and the detection switch 108 may be operated. When this happens, the disk tray 101 enters the state compulsorily loaded though it is unloaded and a turntable 103 and a head unit 104 will be driven.

The present invention has been devised in order to solve such a problem, to improve system safety even if the disk tray is drawn out from the PC main body and led to a structurally dangerous state, and to prevent the disk tray from erroneous operation.

Moreover, as shown in FIG. 11 and FIG. 12, when the guide shaft is biased upward and the height position is adjusted with the adjusting screw, it is preferable that the bias force is as strong as possible in the range where the guide shaft is not deformed. That is, it becomes an important condition that the head unit may never vibrate due to the spring flexion when vibration is applied to the PC main body and, moreover, the spring force does not decrease as time passes However, in case of the composition of FIG. 11, it is necessary to increase the turn number of coil of the helical compression spring in order to secure the spring force and, at the same time, satisfactory maintain a stress characteristic, therefore, the helical compression spring becomes lengthy. An increase in the structural thickness of the entire unit provides enough space to interpose the lengthened helical compression spring, but this increase will influence the thinning of the PC main body. In addition, the height position, that becomes the standard of the guide shaft, will be greatly changed, and a corresponding design change is precipitated.

On the other hand, according to the composition of FIG. 12, it is necessary to adopt a leaf spring having a longer spring, in order to secure the spring force and, at the same time, satisfactory stress maintain a characteristic similarly to the case of helical compression spring and, therefore, the size of the entire leaf spring grows, and it becomes disadvantageous for miniaturization. Moreover, because the spring constant is steep, the leaf spring is irregular in bias force, making it difficult to obtain a high reliability.

The present invention offers a bias means that can strongly bias the guide shaft. In addition, it is the aim of the present invention to prevent the structural thickness of the entire unit from growing, especially considering the bias or spring force may not always be functioning, meaning a more efficient design is desired.

SUMMARY OF THE INVENTION

In accordance with the present invention, a disk device is provided to execute a load/unload function together with a recording medium by making a disk tray advance and retreat in a chassis case. A first detection switch and a second detection switch for detecting the load of the disk tray are arranged in a way to be on different levels in respect to the operating direction thereof, or they are arranged on a wiring board packaged in the disk tray.

Moreover, the present invention concerns a disk device composed to execute the load/unload function together with a recording medium by making a disk tray advance and retreat in a chassis case, wherein a detection switch that detects the disk tray being loaded, is installed in the disk tray. Alternately, the detection switch is arranged on a wiring board packaged in the disk tray in such a way that the detection switch is disposed at a position to be covered by the rear end of the disk tray.

According to another aspect of the present invention, there is provided a recording and playback system, comprising a head unit composed to record and playback information by moving in parallel to the recording face of a recording medium. A guide shaft for guiding the translation of the head unit and a bias means for applying bias force to the guide shaft at all times is also provided. The system includes a retaining means for adjusting the height position of the guide shaft by a drag balanced with the bias force of the bias means. The bias means is provided, for example, as a coil part of a helical torsion spring inserted into the guide shaft.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

The following description of embodiments of the present invention provides details based on drawings. It should be noted that the embodiments described below suppose a composition where the disk device is built into a PC main body, the present invention is not to be so limited, but can also be executed for a disk device of an external type.

Figure 1:
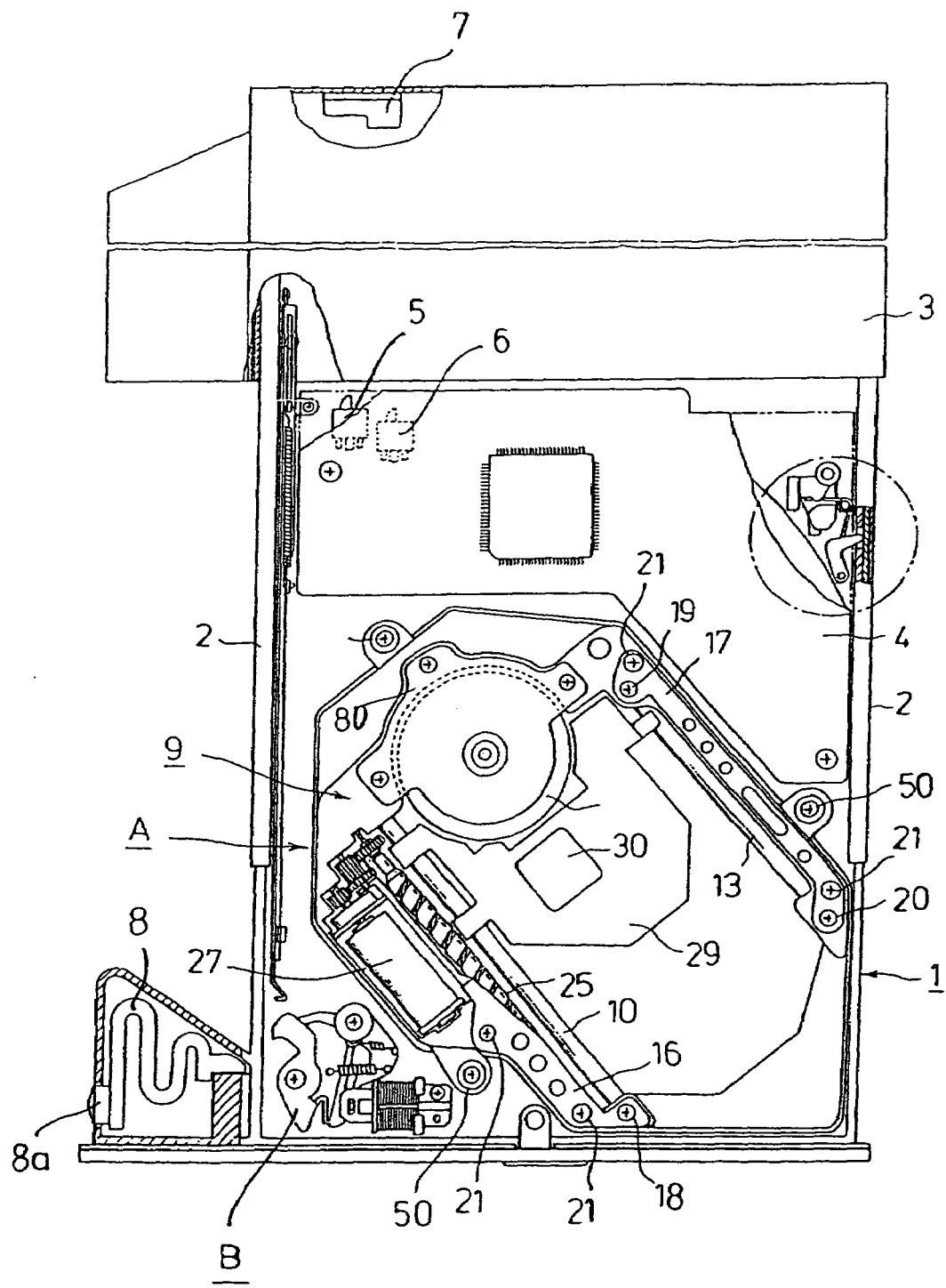
FIG. 1 is a plan view showing the bottom of the disk device according to an embodiment.

FIG. 1 is a disk device that executes the present invention, showing a state where a shield cover built with a metallic lamina is detached from the bottom face of the disk tray 1 and this disk tray 1 is guided by a guide rail 2 and loaded or unloaded in the chassis case.

A wiring board 4, that comprises electronic components such as semiconductor integrated circuits, is packaged on this disk tray 1, a driving system unit A to drive the optical disk and the head unit is arranged in the center portion, and an eject/lock mechanism B of the disk tray is set in the corner portion of the front end.

Figure 2:
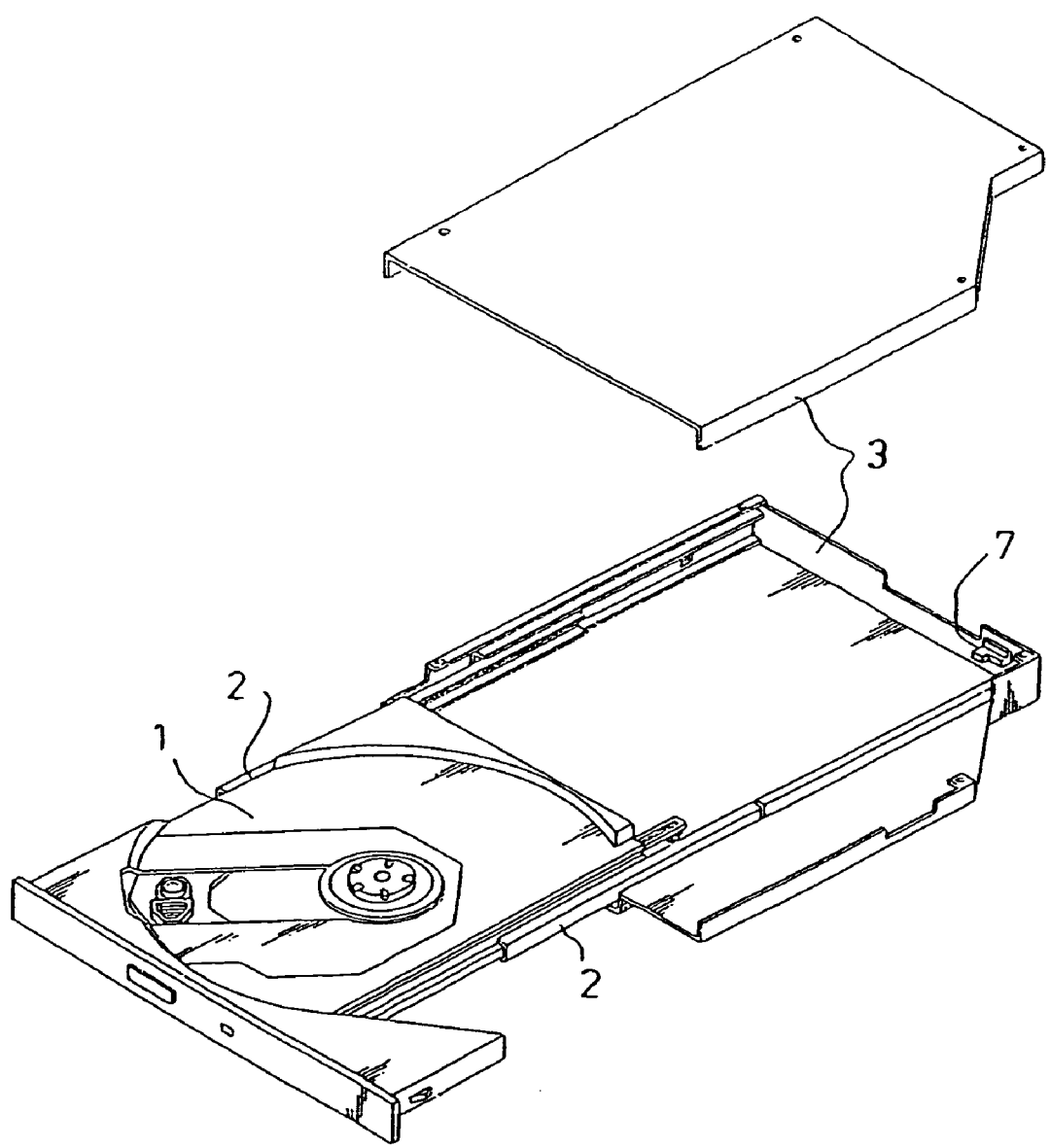
FIG. 2 is a perspective view showing the disk device of the present invention.

A first detection switch 5 and a second detection switch 6 are installed on the rear end of the wiring board 4 in different levels, as shown in the same drawing, in respect to the operation direction (direction of the depth) of the switch. Moreover, when the disk tray 1 is pushed into the chassis case 3, and locked with the eject/lock mechanism B, an actuator 7 for operating the first and second detection switches 5, 6, are fixed to the inner wall at the rear end of the chassis case 3 as shown in FIG. 2.

The symbol 8 is a damper member built into the side of the disk tray 1, and when disk tray 1 is pushed into the chassis case 3, the point 8a thereof will be brought into slide contact with the inside wall 3a of the chassis case 3, improving the operation sense of the disk tray by buffering deviation of the disk tray, especially in a horizontal direction. Damper member 8 includes a meander line-formed portion, which permits damper number 8 to perform an important buffering effect.

First and second detection switches 5, 6 are connected so that each double pole contact points in first and second switches 5, 6 form a series circuit, and the circuit enters a first state when both detection switches are operated, while the circuit enters a second state when both or one of the detection switches are not operated. It should be apparent that either of the first and second states may be conductive or non-conductive, depending on a desired design.

Figure 3:
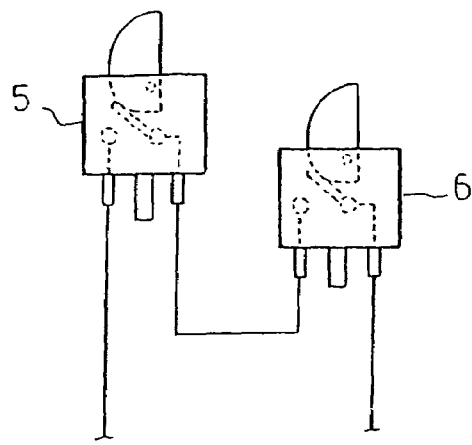
FIG. 3 is a view showing the mode of the operation of the detection switch of the present invention.
Figure 3:
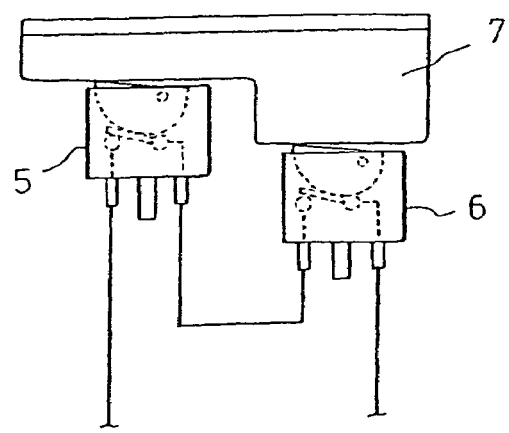
Figure 3:
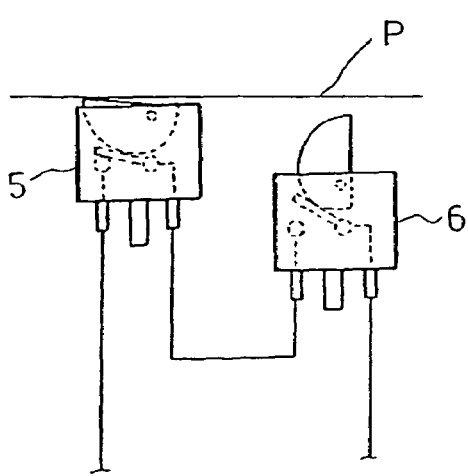
Figure 4:
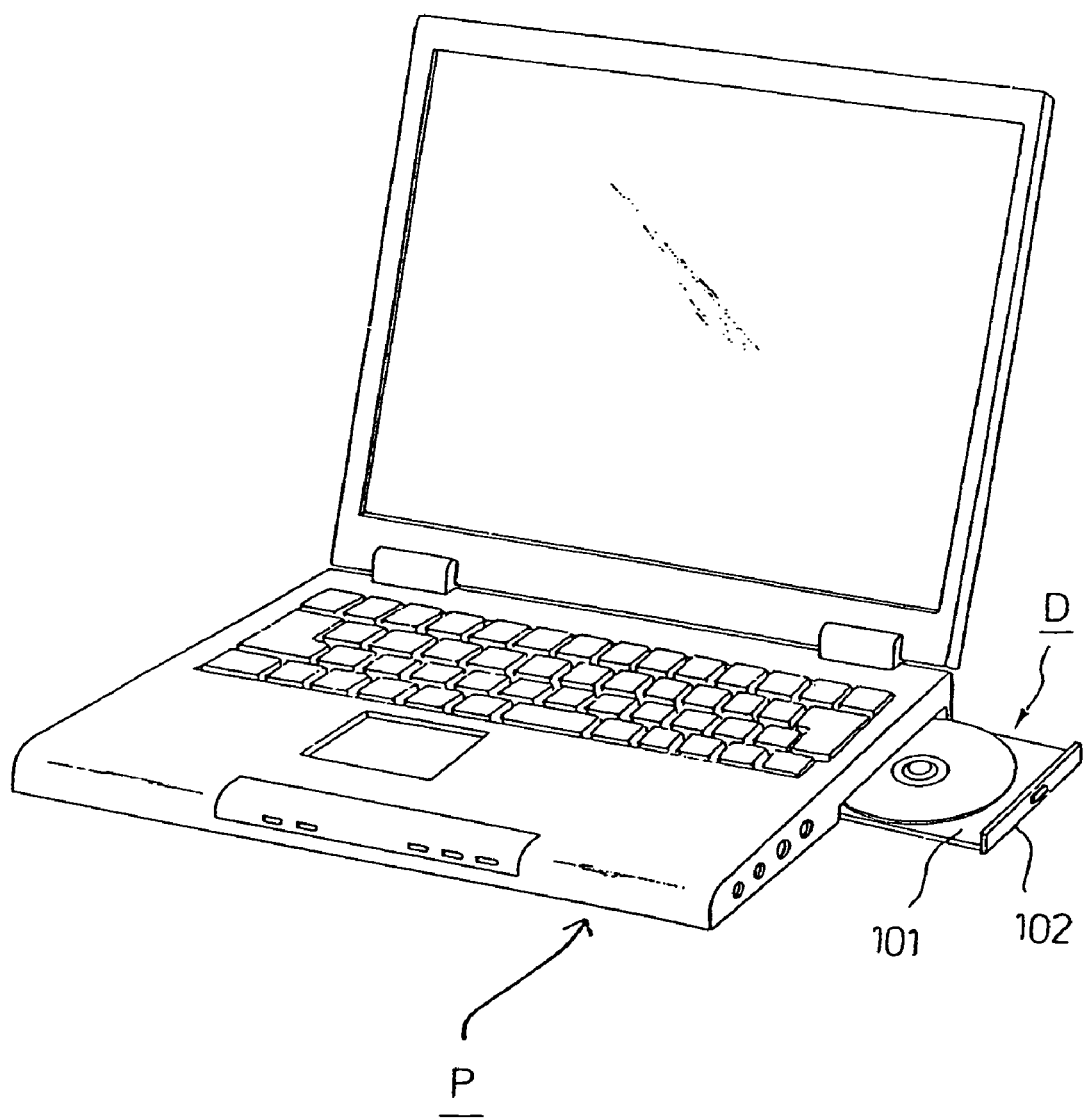
FIG. 4 is a perspective view showing a laptop PC.

FIG. 3 is a drawing to explain the operation mode of first and second detection switches 5,6. FIG. 3(A) shows an exemplary state where disk tray 1 is unloaded while the first and second detection switches are released from actuator 7, and therefore, the circuit is in a nonconductive state, for example, because first and second detection switches 5,6 are open. FIG. 3(B) is an exemplary state where disk tray 1 is loaded, first and second detection switches 5,6 are open by the action of actuator 7, and the circuit is conductive, for example.

Figure 5:
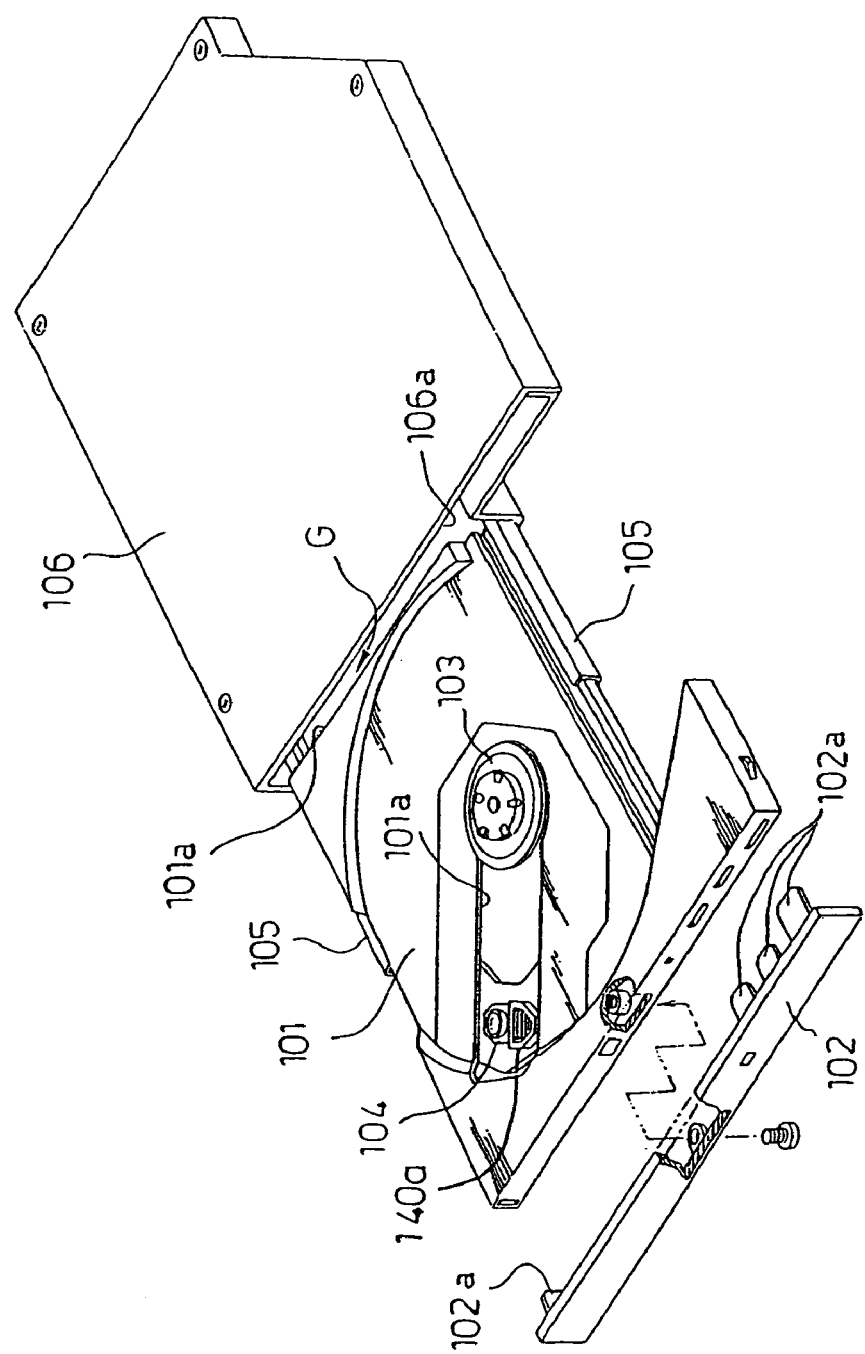
FIG. 5 is a perspective view showing the composition of the disk device.
Figure 6:
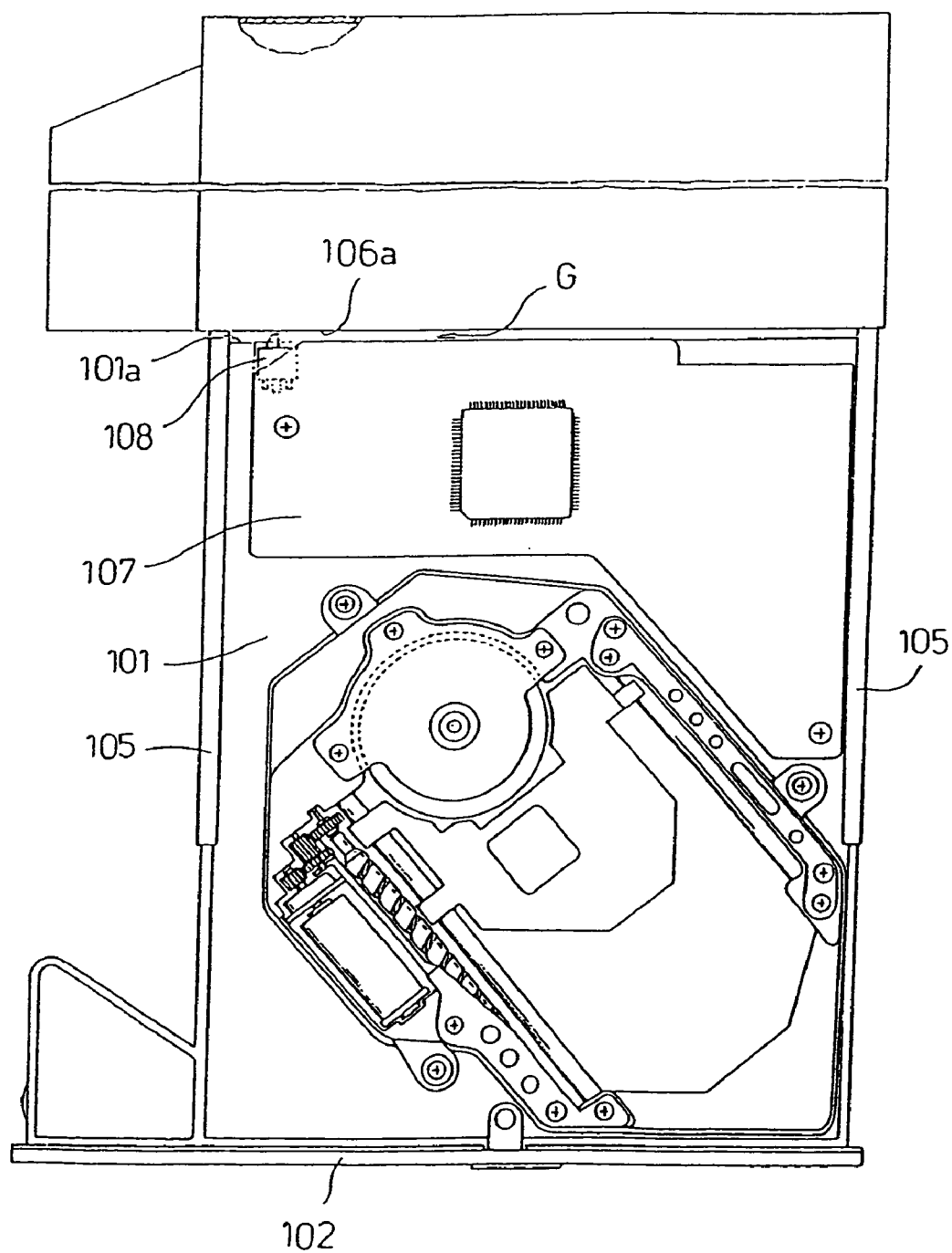
FIG. 6 is a view showing the arrangement of the detection switch in a disk device of the prior art.

FIG. 3(C) shows a state where a foreign body P, such as piece of paper, etc., is inserted from a gap G (e.g. FIG. 5). Foreign body P prevents second detection switch 6 from operating in this instance, because foreign body P is inhibited from further extending into disk tray I by the main body of detection switch 5, even though foreign body P operates first detection switch 5. Because second detection switch 6 remains unactuated, the circuit maintains a nonconductive state, for example, permitting the system to avoid erroneous actuation to improve the safety of the system and the disk tray when disk tray 1 is unloaded.

According to one composition of the present invention in the exemplary application, at least one of first detection switch 5 or second detection switch 6 is arranged at a position covered with the rear end of the disk tray 1. The switch 5,6 may also be covered with a rear end of wiring board 4 and, consequently, switches 5,6 are packaged to prevent exposure of their component parts at an external area between disk tray 1 and wiring board 4. This configuration contributes to preventing improper operation outside the range of normal action, for example, when foreign objects may be present in disk tray 1.

First and second detection switches 5,6 need not be connected in series, but may be arranged variously to execute a desired control design. For example, one switch may be connected to the microcomputer for controlling the disk device, while the other may be connected to the laser power supply line and/or the spindle motor power supply line.

Returning to FIG. 1, a wiring board 4, that packages electronic components such as semiconductor integrated circuits, is set in disk tray 1. In addition, a driving system unit A for the optical disk and the head unit are fixed with a screw 50 in a buffered state.

Figure 7:
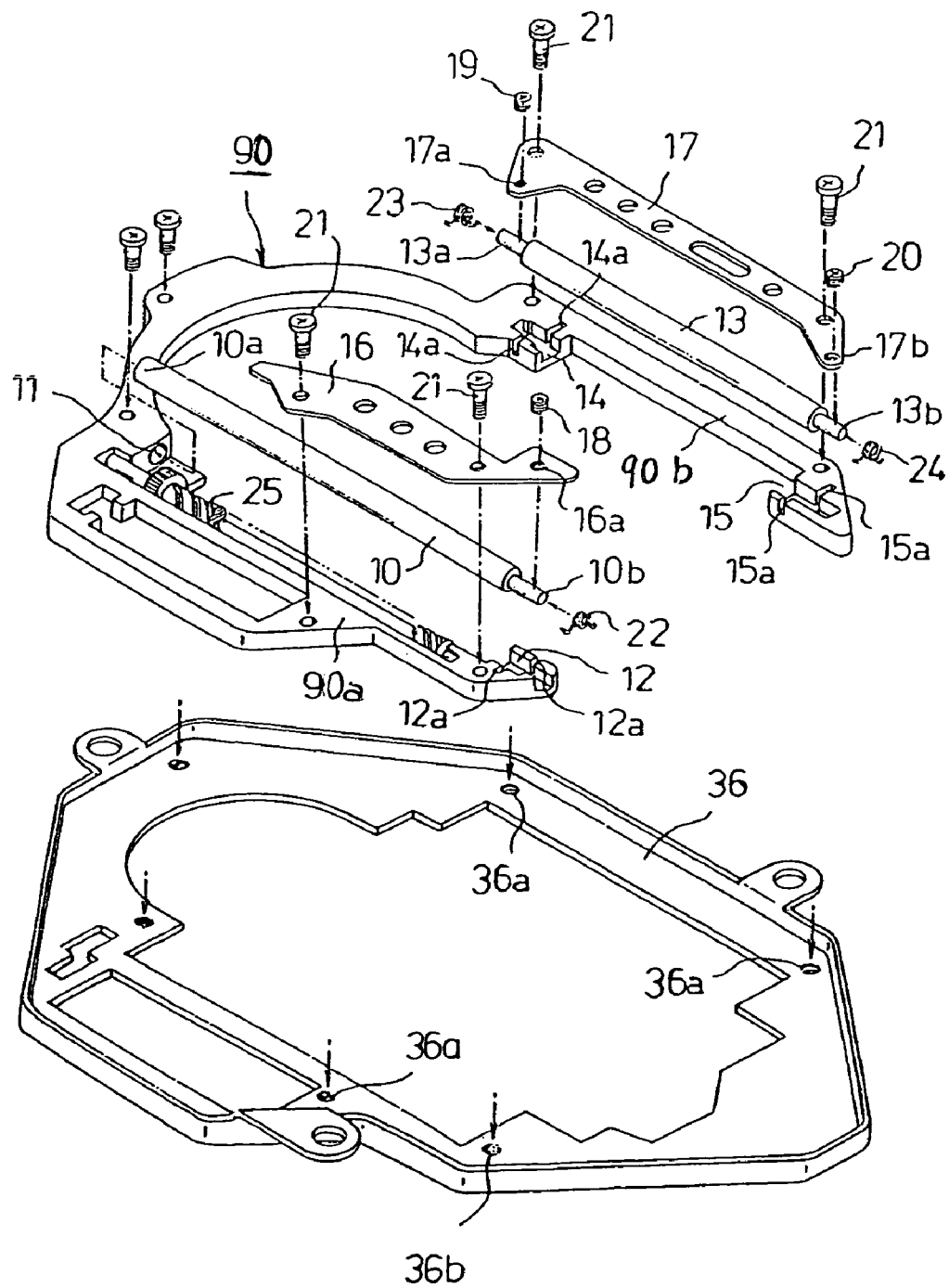
FIG. 7 is a exploded perspective view showing the composition of the recording and playback system of the present invention.
Figure 8:
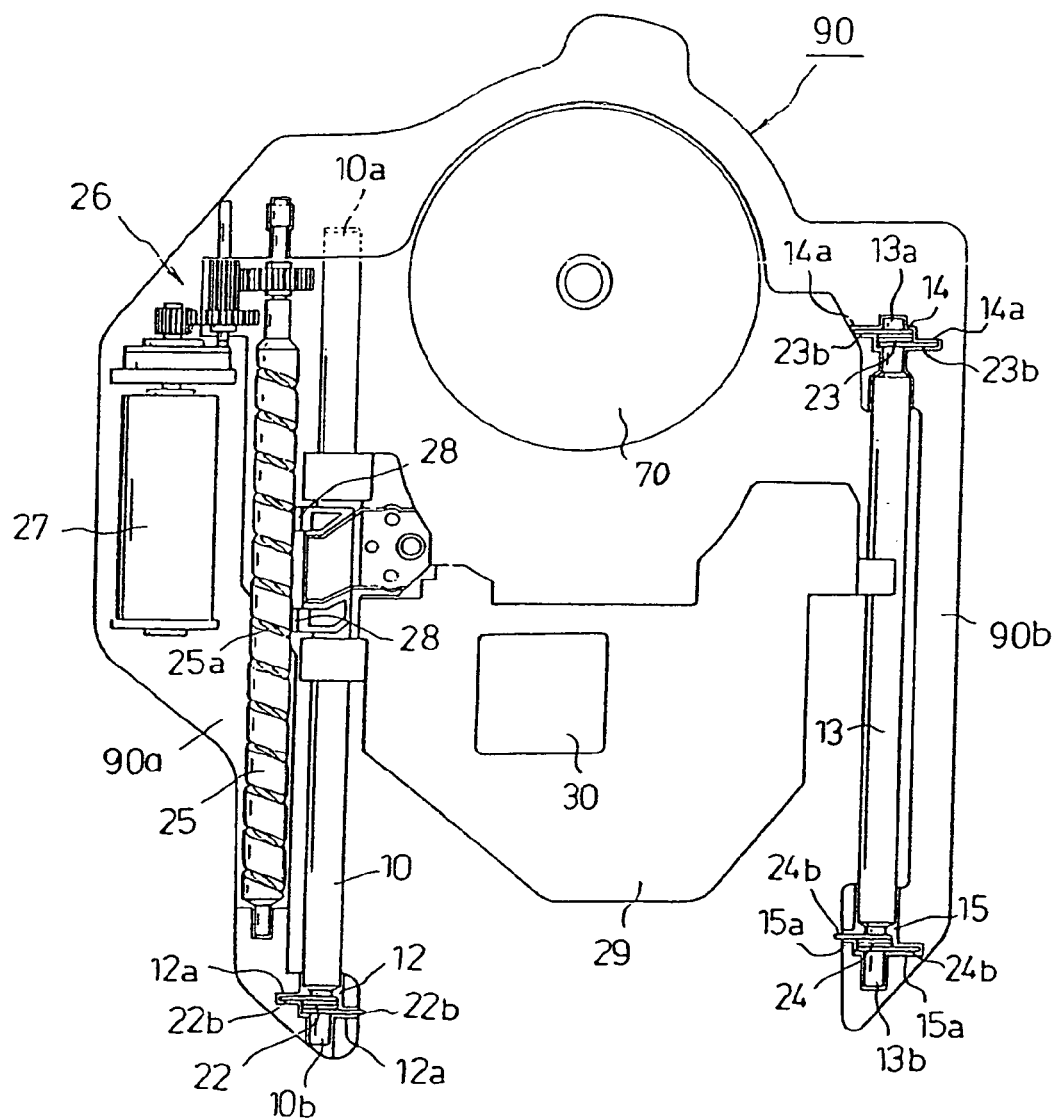
FIG. 8 is a plan view showing the assembly state of the recording and playback system of the present invention.

Driving system unit A includes element parts that are arranged on a base plate 36 molded from a steel plate as shown in FIG. 7. Unit A also includes a spindle motor 70 to rotate and to drive a turntable on the surface of disk tray 1, as shown in FIG. 8. Spindle motor 70 is fixed to a frame member 90 with a backing plate 80.

Frame member 90 may be made integrally of synthetic resin. Legs 90*a* and 90*b* are formed laterally or right and left from a fixing portion of spindle motor 70. An impaction hole 11 of an end part 10*a* of guide shaft 10 is formed on leg 90*a*. A concave reception part 12 having a small diameter end part is formed in an area of leg 90*a* suitable for locating a small diameter end part 10*b* of guide shaft 10. Concave reception parts 14 and 15 having a small diameter end part are formed in an area where small diameter end parts 13*a*, 13*b* of both ends of the guide shaft 13 are to be located on leg 90*b*.

Figure 9:
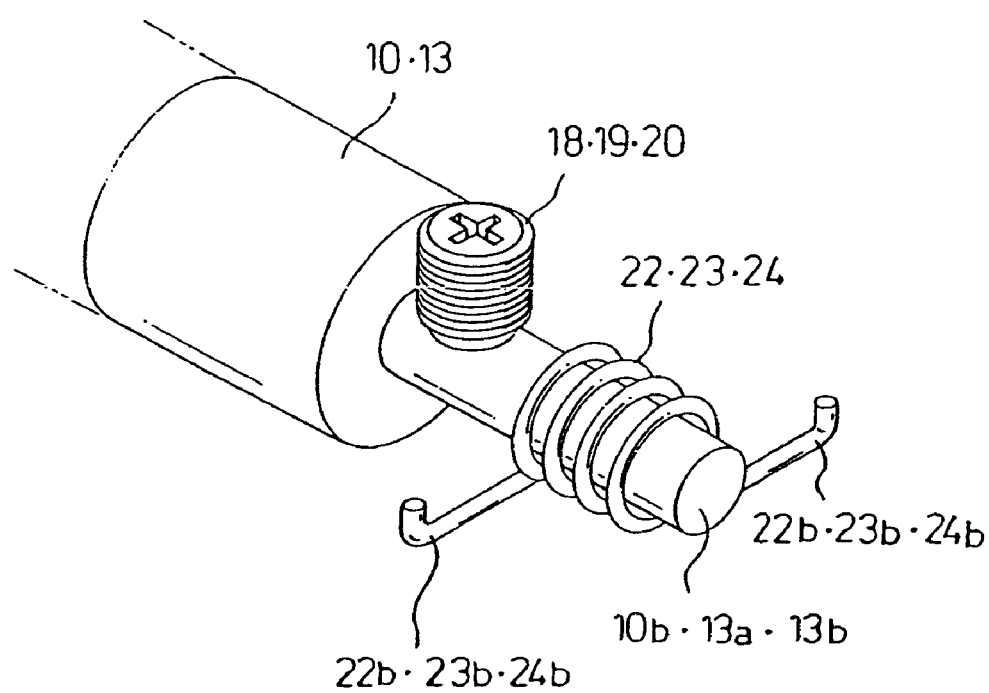
FIG. 9 is a perspective view showing the composition of the bias means according to the present invention.

Reinforcing boards 16 and 17 are provided over guide shafts 10, 13, respectively. A screw hole 16*a* where an adjusting screw 18 is screwed into position is formed in an end part of reinforcement board 16. Moreover, screw holes 17*a*,17*b* where adjusting screws 19□,20 are screwed into position are formed at ends of reinforcement board 17. Referring to FIG. 9, coil parts 22*a*,23*a*,24*a* of helical torsion springs 22,23,24 are pushed onto small diameter end parts 10*b*,13*a*,13*b* of guide shafts 10,13. In this state, when small diameter end parts 10*b*,13*a*,13*b* are contained in concave reception parts 12,14,15, arms 22*b*,23*b*,24*b* of helical torsion springs 22,23,24 are positioned in grooves 12*a*,14*a*,15*a* of concave reception parts 12,14,15, and arms 22*b*,23*b*,24*b* receive support from projections 12*b*,14*b*,15*b* in the grooves 12*a*,14*a*,15*a* (refer to FIG. 10). Grooves 12*a*,14*a*,15*a* also form a fitting portion that prevents helical torsion springs 22,23,24 from being moved in the direction of the axis of shafts 10, 13.

Reinforcement boards 16,17 are arranged to cover guide shafts 10,13 after guide shafts 10,13 are arranged in frame member 90, and fixing screws 21 are screwed into screw hole 36*a* of base plate 36. This arrangement fixes frame member 90 and reinforcement boards 16,17 at the same time. Once screws 21 are secure to produce a fixed state, adjusting screws 18,19,20 at end parts of reinforcement boards 16,17 are located on diameter end parts 10*b*,13*a*,13*b* of guide shafts 10, 13, as shown in FIG. 9. Therefore, reinforcement boards 16,17 support adjusting screws 18,19, 20 and provide the function of improving constructional strength of the entire driving system unit A.

A screw shaft 25 is disposed on leg 90*a* of frame member 90, and the turning force of a thread motor 27 is transmitted to the screw shaft with a gear unit 26. Therefore, by rotating screw shaft 25, a nut 28 fitted with lead groove 25*a* thereof follows. A head base 29 connected to nut 28 is guided by guide shafts 10,13 and it reciprocates with rotation of screw shaft 25. Parts of the optical system such as optical picking up 30 are packaged on head base 29, and move radially in parallel to the record face of the recording medium along with the movement of head base 29. Recording reproduction of information is performed according to this configuration.

A cost decrease can be achieved by reducing the parts count of driving system unit A through the simplified design of components on frame member 90. The accuracy error of the packaging position of the optical pickup 30 supported by the guide shafts 10,13 in respect to the turning centre (namely, disk turning centre) of the spindle motors 70 can also be reduced, according to this construction. Driving system unit A provides support for both ends of the guide shafts 10,13, both ends of the screw shaft 25, thread motor 27, gear units 26, and spindle motor 70 with frame member 90, thereby achieving a number of improvements and advantages. In addition, unit A may be formed integrally, and consequently, a recording and playback system exhibiting satisfactory recording characteristics can be provided.

Figure 10:
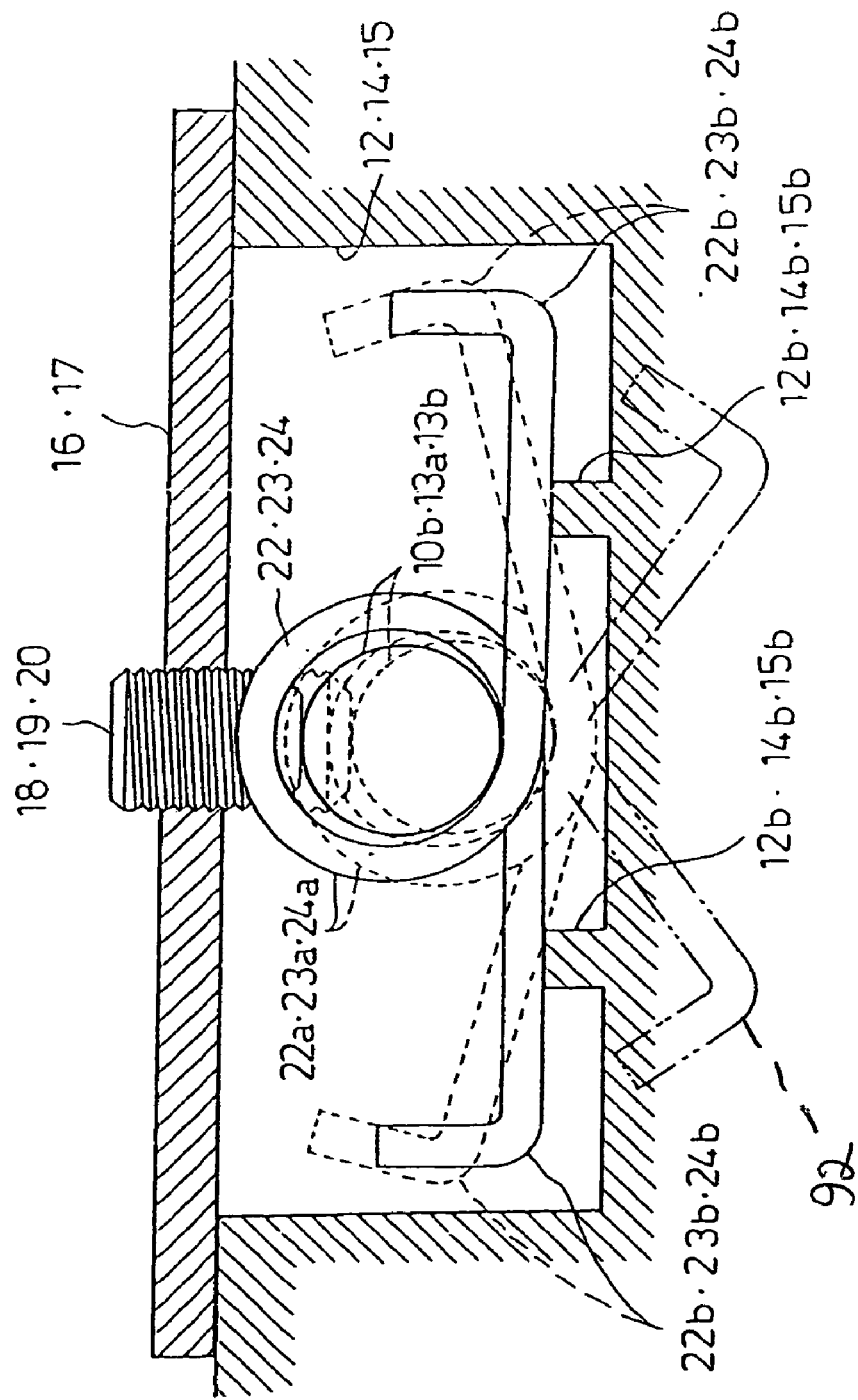
FIG. 10 is a side view showing the action state of the bias means according to the present invention.
Figure 11:
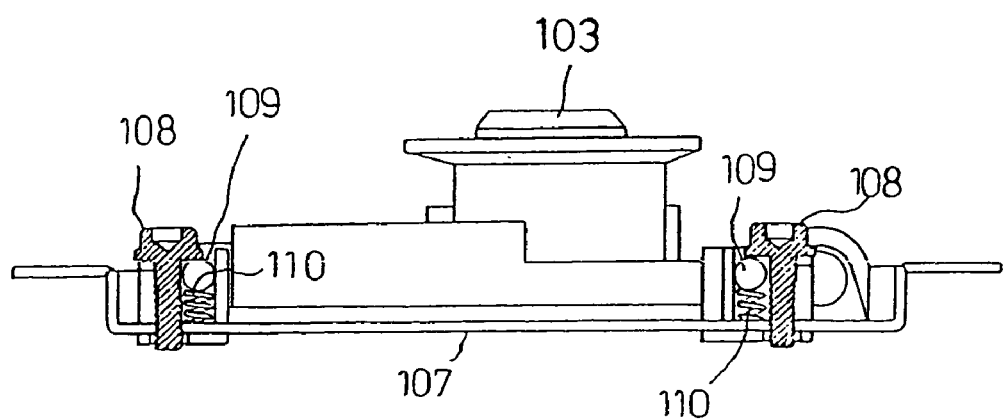
FIG. 11 is a side view showing an example of the bias means of a guide shaft of the prior art.
Figure 12:
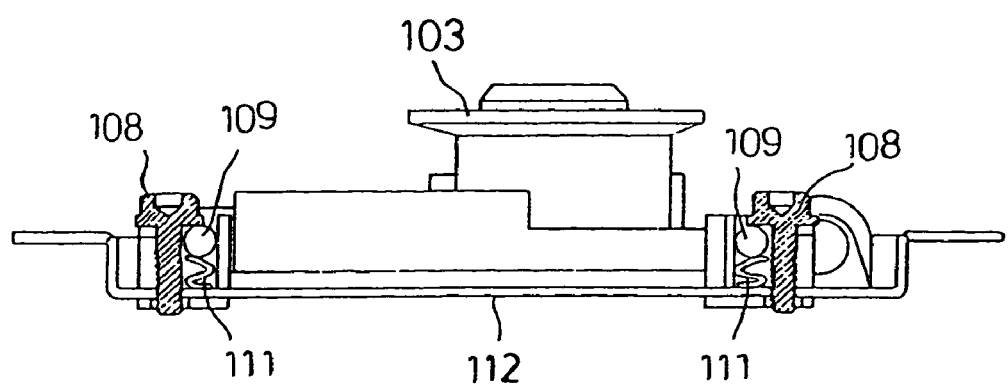
FIG. 12 is a side view showing another example of the bias means of a guide shaft of the prior art.

When driving system unit A is assembled as shown in FIG. 1, adjusting screws 18,19,20 of reinforcement boards 16,17 contact the top portion of the curved surface of the small diameter end parts 10*b*,13*a*,13*b* of the guide shafts 10,13 as shown in FIG. 10. The coil parts 22*a*,23*a*,24*a* of the helical torsion springs 22,23,24 are pushed down by the small diameter end parts 10*b*,13*a*,13*b* of the guide shaft in this instance. Arms 22*b*,28*b*,24*b* turn up to be supported by projections 12*b*,14*b*,15*b* at the position shown by the solid line of FIG. 10.

In an unloaded state where a tensile effect is not imparted, helical torsion springs 22,23 is equal to the positioning of the arm at the position shown by a virtual line 92 in FIG. 10. When springs 22–24 enter the assembly state, a spring force with helical torsion springs 22,23,24 is generated. A bias force, that pushes up the small diameter end parts 10*b*,13*a*, 13*b* of the guide shafts 10,13 is thus applied. If adjusting screws 18,19,20 are rotated guide shafts 10,13 are displaced a given distance. For example, as helical torsion springs 22,23,24 descend as shown by the broken line 94 in FIG. 10 as screws 18,19,20 are screwed downward. Accordingly, the adjustment of the height position of guide shafts 10,13 becomes possible.

According to this configuration, the bias force, or release of spring force, of helical torsion springs 22,23,24, that is, the release of spring force is inhibited with adjusting screws 18,19,20. The stationary pressure of adjusting screws 18,19, 20 act as a drag or counter to the bias force and balances the spring force. The balancing force allows the guide shafts 10,13 to be set to an arbitrary height position. Moreover, because guide shafts 10,13 are inserted in the coil part of helical torsion springs 22,29,24 a spring force is obtained from both arms, delivering an important spring force over a range of displacement in a space efficient design.

It should be noted that, in the case of embodiments described hereinabove, an accurate adjustment of guide shafts 10, 13 is enabled even though end part 10*a* of guide shaft 10 is maintained in impaction hole 11 of frame member 90. As an example, the height position or guide shafts 10,13 can be individually adjusted at the end part of three locations to match the fourth, fixed location, assuming the fourth end part to be a standard height position.

As described in detail hereinbefore, according to the present invention, the cable run to the disk tray is routed through the first detection switch and the second detection switch arranged in different levels. Accordingly, the circuit will not become conductive erroneously by a foreign body, and it is possible to make it a highly safe and reliable disk device.

Moreover, as the first detection switch and the second detection switch are covered with the disk tray, for instance, accidents or inadvertent operation by children or others is avoided.

In addition, high reliability can be obtained because enough bias force on the guide shaft is obtained to achieve robust operation. The spring force does not significantly decrease with time due to the use of a helical torsion spring with a strong spring force. Moreover, because the coil part of the helical torsion spring is inserted onto the small diameter end part of the guide shaft, an increase in device thickness is avoided. Accordingly, although the spring contributes onto a large force to positioning the guide shaft, it does so in a minimal space. The design provides robust operation, while avoiding an increase in size.

What is claimed is:

1. A disk device composed to execute a load/unload action together with a recording medium by making a disk tray advance and retreat in a chassis case in relation to load and unload states, comprising:

a first detection switch and a second detection switch for detecting the load action of said disk tray and installed in said disk tray, arranged to be on different levels with respect to the an operating direction of said disk tray, wherein both detection switches are operated by an actuator located on an inner wall of the chassis case adjacent the disk tray at the load state and both of the detection switches are not operated at the unload state.

2. The disk device of claim 1, wherein one or more of said first detection switch and or said second detection switch are is arranged on a wiring board installed in said disk tray.

3. The disk device of claim 1, wherein composed to execute a load/unload action together with a recording medium by making a disk tray advance and retreat in a chassis case, comprising:

a one or more of said first detection switch or said second detection switch is for detecting the loaded state of said disk tray, installed in said disk tray, and disposed at a position covered by a rear end of said disk tray.

4. The disk device of claim 3, wherein said first detection switch and said second detection switch are arranged on a wiring board installed in said disk tray.

5. The disk device of claim 4, wherein said first detection switch and said second detection switch are arranged between said disk tray and said wiring board, and one or more of said first detection switch or said second detection switch is covered by a rear end of said disk tray and said wiring board.

6. A disk device composed to execute a load/unload action, the device comprising:

a chassis case;
a disk tray arranged in the chassis case and moveable between an unload state in which the disk tray is substantially entirely advanced externally to the chassis case and a load state in which the disk tray is substantially entirely retreated within the chassis case;
a first detection switch and a second detection switch positioned in the disk tray and located at differing positions along a direction in which the disk tray advances and retreats; and
both of the first and second detection switches being operated upon the disk tray being moved to the load state, whereby the first and second detection switches detect the load state when operated.

7. The disk device according to claim 6, further comprising an actuator in the chassis case and positioned to operate both of the first and second detection switches upon the disk tray reaching the load state.

8. The disk device according to claim 6, wherein one or more of the first and second detection switches is not operated if the disk tray is not in the load state.

* * * * *